United States Patent

Dieffenderfer et al.

Patent Number: 5,822,608
Date of Patent: Oct. 13, 1998

[54] ASSOCIATIVE PARALLEL PROCESSING SYSTEM

[75] Inventors: James Warren Dieffenderfer, Owego; Peter Michael Kogge, Endicott; Paul Amba Wilkinson, Apalachin; Nicholas Jerome Schoonover, Tioga Center, all of N.Y.

[73] Assignee: International Business Machines Corporation, Armonk, N.Y.

[21] Appl. No.: 301,278

[22] Filed: Sep. 6, 1994

Related U.S. Application Data

[63] Continuation of Ser. No. 611,594, Nov. 13, 1990, abandoned.

[51] Int. Cl.[6] .......................... G06F 15/16; G06F 15/76; G06F 15/80
[52] U.S. Cl. ............................... 395/800.2; 395/800.11; 395/800.17; 395/800.16
[58] Field of Search ...................... 395/800, 200, 395/275, 375, 325, 800.2, 800.21, 800.22, 800.16, 800.15, 800.13, 800.11, 800.17, 379

[56] References Cited

U.S. PATENT DOCUMENTS

| | | | |
|---|---|---|---|
| 3,537,074 | 10/1970 | Stokes et al. | 340/172 |
| 3,544,973 | 12/1970 | Borck et al. | 340/172.5 |
| 3,970,993 | 7/1976 | Finnila | 340/172.5 |

(List continued on next page.)

FOREIGN PATENT DOCUMENTS

| | | |
|---|---|---|
| 0132926 | 2/1985 | European Pat. Off. . |
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |

(List continued on next page.)

OTHER PUBLICATIONS

Jesshope et al., "Design of SIMD Microprocessor Array", IEE Proceedings, vol. 136, Pt.E. No. 3, May 1989, pp. 197–204.

(List continued on next page.)

*Primary Examiner*—Larry D. Donaghue
*Attorney, Agent, or Firm*—Lynn L. Augspurger

[57] ABSTRACT

Multiprocessor parallel computing systems and a byte serial SIMD processor parallel architecture is used for parallel array processing with a simplified architecture adaptable to chip implementation in an air cooled environment. The array provided is an N dimensional array of byte wide processing units each coupled with an adequate segment of byte wide memory and control logic. A partitionable section of the array containing several processing units are contained on a silicon chip arranged with "Picket"s, an element of the processing array preferably consisting of combined processing element with a local memory for processing bit parallel bytes of information in a clock cycle. A Picket Processor system (or Subsystem) comprises an array of pickets, a communication network, an I/O system, and a SIMD controller consisting of a microprocessor, a canned routine processor, and a microcontroller that runs the array. The Picket Architecture for SIMD includes set associative processing, parallel numerically intensive processing, with physical array processing similar to image processing, a military picket line analogy fits quite well. Pickets, having a bit parallel processing element, with local memory coupled to the processing element for the parallel processing of information in an associative way where each picket is adapted to perform one element of the associative process. We have provided a way for horizontal association with each picket. The memory of the picket units is arranged in an array. The array of pickets thus arranged comprises a set associative memory. The set associative parallel processing system on a single chip permits a smaller set of 'data' out of a larger set to be brought out of memory where an associative operation can be performed on it. This associative operation, typically an exact compare, is performed on the whole set of data in parallel, utilizing the Picket's memory and execution unit.

37 Claims, 6 Drawing Sheets

U.S. PATENT DOCUMENTS

| | | | |
|---|---|---|---|
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |
| 4,523,273 | 6/1985 | Adams III et al. | 364/200 |
| 4,591,981 | 5/1986 | Kassabov | 395/800 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 395/800 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton et al. | 395/800 |
| 4,910,665 | 3/1990 | Mattheyses et al. | 364/200 |
| 4,916,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyma et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/49 |
| 5,041,189 | 8/1991 | Tamitani | 364/200 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey Jr. et al. | 340/825.02 |
| 5,187,801 | 2/1993 | Zenios et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |

FOREIGN PATENT DOCUMENTS

| | | |
|---|---|---|
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 2223867A | 4/1990 | United Kingdom . |
| 89/09967 | 4/1988 | WIPO . |
| 92/06436 | 4/1992 | WIPO . |

OTHER PUBLICATIONS

Lea, R.M., "ASP Modules: Cost–Effective Building–Blocks for Real–Time DSP Systems", Journal of VLSI Signal Processing, vol. 1, No. 1, Aug. 1989, pp. 69–84.

J.R. Nickolls, "The Design of the MasPar MP–1: A Cost Effective Massively Parallel Computer", 1990 IEEE, pp. 25–28.

J.F. Prins and J.A. Smith, "Parallel Sorting of Large Arrays on the MasPar MP–1*", The 3rd Symposium on the Frontiers of Massively Parallel Computation, pp. 59–64, Oct., 1990.

J.B. Rosenberg and J.D. Becher, "Mapping Massive SIMD Parallelism onto Vector Architectures for Simulation", Software–Practice and Experience, vol. 19(8), pp. 739–756, Aug., 1989.

J.C. Tilton, "Porting an Iterative Parallel Region Growing Algorithm from the MPP to the MasPar MP–1", The 3rd Symposium on the Frontiers of Massively Parallel Computation, pp. 170–173, Oct. 1990.

"Sequent Computer Systems Balance and Symmetry Series", Faulkner Technical Reports, Inc. pp. 1–6, Jan., 1988.

"Symmetry 2000/400 and 2000/700 with the DYNIX/ptx Operating System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct. 1991.

Fountain et al. ("The Clip7A Image Processor") May 1988; IEEE.

Peng et al. "Parallel Image Processing on a Transputor–Based System" Mar. 1990; IEEE.

Kaneko et al. ("Processing Element Design for Parallel Computer"); Apr. 1990; IEEE.

Higuchi et al.; IXM2: a Parallel Associative Processor for Semantic Net.

Processing –Preliminary Evaluation Nov. 1990.

Peng Parallel Image Processing on a Transputer–Based System, 1990.

Frison et al "Designing Specific Systolic Arrays with API1SC Chip" Sep. 1990; IEEE.

Scherson et al. "Bit Parallel Arithmetic in Massively—Parallel Associative Processor" Oct. 1992. IEEE Tran. on Comp.

Alleyue et al. "A Bit–Parallel, Word–Parallel, Massively Parallel Associative Processor" Oct. 1990; IEEE.

DeGroot et al. "Image Processing Using the SPRINT Multiprocessor" Aug. 1989 IEEE.

"Design Specific Systolic Arrays with API1SC Chip" Frison et al, Sep. 1990 IEEE.

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

H.P. Bakoglu, "Second–Level Shared Cache Implementation For Multiprocessor Computers With A Common Interface For The Second–Level Shared Cache And The Second–Level Private Cache", IBM Technical Disclosure Bulletin, vol. 33, No. 11, pp. 362–365, Apr. 1991.

Mansingh et al., "System Level Air Flow Analysis for a Computer System Processing Unit", *Hewlett–Packard Journal*, vol. 41 No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1 –3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP–1: A Cost Effective Massively Parallel Computer", 1990 IEEE, pp. 25–28.

J.F. Prins and J.A. Smith, "Parallel Sorting of Large Arrays on the MasPar MP–1*, The 3rd Symposium on the Frontiers of Massively Parallel Computation", pp. 59–64, Oct., 1990.

J.B. Rosenberg and J.D. Becher, "Mapping Massive SIMD Parallelism onto Vector Architectures for Simulation", Software–Practice and Experience, vol. 19(8), pp. 739–756, Aug. 1989.

J.C. Tilton, "Porting an Interactive Parallel Region Growing Algorithm from the MPP to the MasPar MP–1", The 3rd Symposium on the Frontiers of Massively Parallel Computation, pp. 170–173, Oct. 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Fineberg et al., "Experimental Analysis of a Mixed–Mode Parallel Architecture Using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D. A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, Hypercube Clock Synchronization:. Concurrency: Practice and Experience, vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Total Architecture: A–NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communication/Data–Conditional Aspects of a Mixed–Mode Parallel Architecture via Synthetic Computations", *Proceeding Supercomputing '90*, Nov. 1990, pp. 647–646.

Kan et al., "Parallel Processing on the CAP: Cellular Array Processor", *COMPCON 84*, 16 Sep. 1984, pp.239–244.

Ezzedine et al., "A 16–bit Specialized Processor Design", *Integration The VLSI Journal*, vol 6 No. 1, May 1988, pp. 101–110.

A. Mudrow, "High Speed Scientific Arithmetic Using a High Performance Sequencer", *ELECTRO*, vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation*, Oct. 8–10, 1990; pp. 176–185.

Jesshoppe et al., "Design of SIMD Microprocessor Array", *IEEE Proceedings*, vol. 136, May 1989, pp. 197–204.

DeGroot et al., "Image Processing Using the Sprint Multiprocesson", *IEEE*, 1989, pp. 173–176.

Nudd et al., "An Heterogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulletin, vol. 32, No.3A, Aug. 1989, pp. 233–238.

Li et al., "Parallel Local Operator Engine and Fast P300", IBM Tech. Disc. Bulletin, vol. 32, No. 8B, Jan. 1990, pp. 295 –300.

R. Duncan, "A Survey of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Issac Schers, "Parallel Processing on VLSI Associative Memory", NSF Award #ECS–8404627, pp. 50–53.

H. Stone, "Introduction To Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Signal Processing, vol. 1, No. 1, Aug. 1989, pp. 69–84.

Isaac D. Scherson, et al., "Bit Parallel Arithmetic in a Massively–Parallel Associative Processor", IEEE, vol. 41, No. 10, Oct. 1992.

Supreet Singh and Jia–Yuan Han, "Systolic arrays", IEEE, Feb. 1991.

H. Richter and G. Raupp, "Control of a Tokamak Fusion Esperiment by a Set of MULTITOP Parallel Computers", IEEE vol. 39, 1992, pp. 192–197.

Higuchi et al., "IXM2: A Parallel Associative Processor for Semantic Net Processing—Preliminary Evaluation–", IEEE, Jun. 1990, pp. 667–673.

Frison et al., "Designing Specific Systolic Arrays with the API15C Chip", IEEE 1990, xii+808pp., pp.505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan*, vol. 8, No. 105, 17 May 1984, p. 274, App. No. JP–820 125 341 (Tokyo Shibaura Denki KK) 27 Jan. 1984.

W.D. Hillis, *"The Connection Machine"*, The MIT Press, Chapters 1, 3, and 4.

"Joho–syori", vol. 26(3), 1985–3, p. 213–225, (Japanese).

VLSI For Artificial Intelligence, "VLSI and Rule–Based Systems", Klumar Academic Pub., 1989, Peter Kogge et al., pp. 95–108.

VLSI Systems Design, "Matrix Crunching With Massive Parallalism", Dec. 1988 Bob Cushman, pp. 18–28.

"Parallel Processing on VLSI Associative Memory", 1987 Ilgen et al., report supported by NSF Award #ECS–h404627 at Dept. of Elec. & Comp. Eng., U. of Cal. Santa Barbara, CA.

"Design of SIMD Microprocessor Array", by C.R. Jesshope et al., IEEE Proceedings, vol. 136, May 1989.

"Survey of Parallel Computer Architectures", R. Duncan, IEEE Computer, Feb. 1990.

"Introduction to Computer Arch.", SRA Research Associates, Inc., Stone et al. pp. 333–338 1975.

Polymorphic–Torus Network, Proceedings of the Int'l Conf. on Parallel Processing, H. Li & M. Maresca; pp. 411–414.

IBM Tech. Disc. Bulletin, vol. 32, No. 3A, Aug. 1989, H. Li et al., Sparse Matrix Vector Multiplication of Polymorphic–Torus, pp. 233–238.

IBM Tech. Disc. Bulletin, vol. 32, No. 8B, Jan. 1990, H. Li et al., "Parallel Local Operator Engine and Fast P300", pp. 295–300.

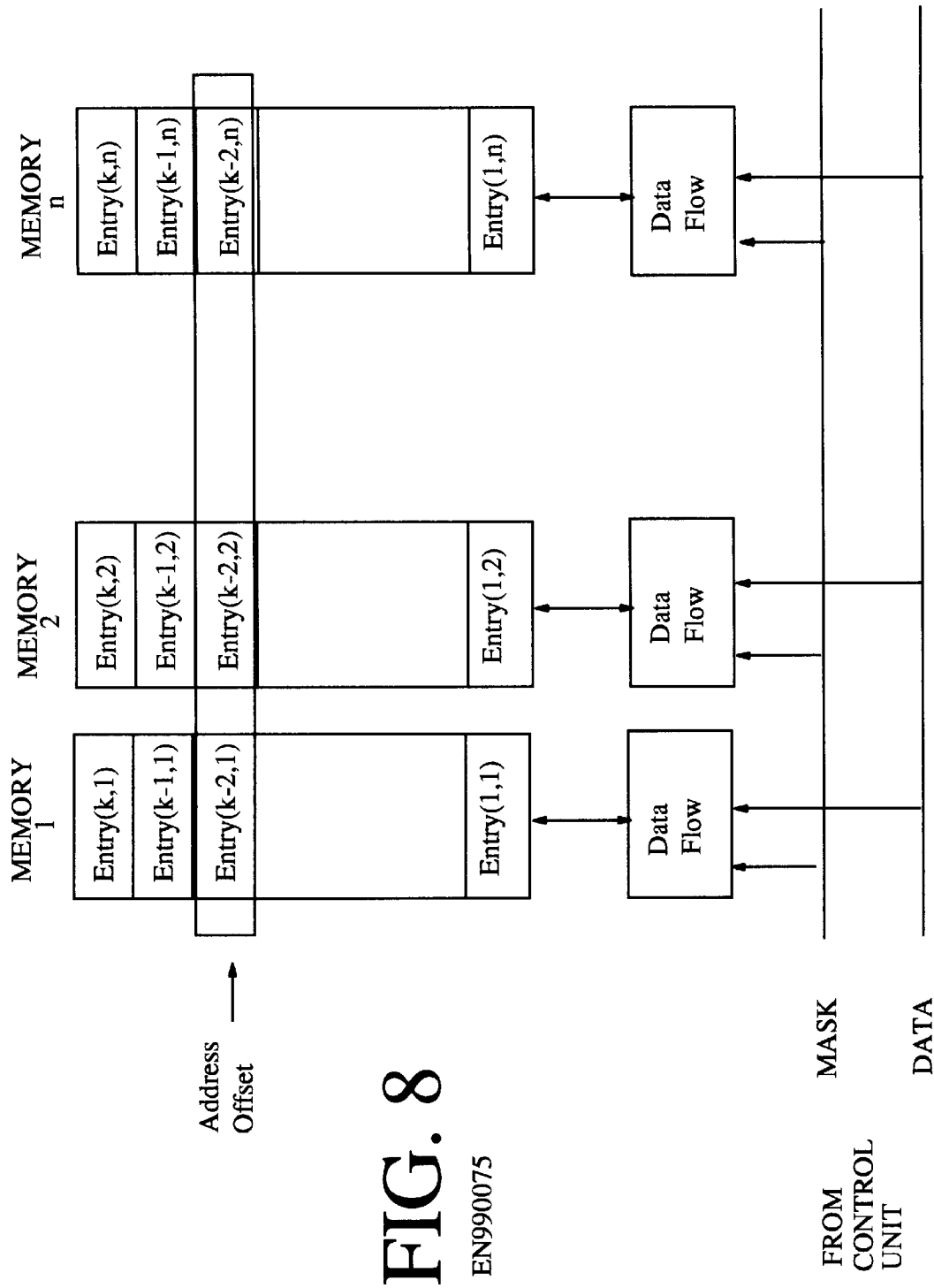

ASSOCIATIVE PARALLEL PROCESSING SYSTEM

CROSS-REFERENCE TO RELATED APPLICATION

This application is a continuation of application Ser. No. 07/611,954, filed Nov. 13, 1990, now abandoned.

FIELD OF THE INVENTION

The present invention relates generally to multiprocessor parallel computing systems and particularly to a byte serial SIMD processor parallel architecture and the system and methods for parallel array processing with a simplified architecture adaptable to single chip type implementation in an air cooled environment.

CROSS REFERENCE TO OTHER PATENTS AND CO-PENDING PATENT APPLICATIONS

Other commonly owned Patents also assigned to the same assignee as the present application and co-pending at the time of filing include:

U.S. Pat. No. 4,992,993 of J. Taylor entitled "SIMD Array Processor With Global Instruction Control And Reprogrammable Instruction Decoders" which issued Feb. 12, 1991;

U.S. Pat. No. 5,257,395 of H. Li entitled "Methods And Circuit For Implementing An Arbitrary Graph On A Polymorphic Mesh" which issued Oct. 26, 1993;

U.S. Pat. No. 5,410,727 of R. Jaffe et al. entitled "Input/Output System For A Massively Parallel, Single Instruction, Multiple Data (SIMD) Computer Providing For The Simultaneous Transfer Of Data Between A Host Computer Input/Output System And All SIMD Memory Devices" which issued on Apr. 25, 1995; and U.S. Pat. No. 5,457,789 of W. Dietrich, Jr. et al. entitled "Method And Apparatus For Performing Memory Protection Operations In A Single Instruction, Multiple Data System" which issued Oct. 10, 1995.

BACKGROUND OF THE INVENTIONS

R. A. Stokes et al, U.S. Pat. No. 3,537,074, issued Oct. 27, 1970 described a array computer with parallel processors and a single programmable control unit, a plurality of registers for storing counterpart vectors, mask registers, and means responsible to a sequence of one or more control unit instructions for concurrently operating on data in the vector registers, and during the 1970's parallel processors described by Stokes became known as SIMD (Single Instruction Multiple Data) machines. Such machines may also be described as consisting of a programmable control unit driving an array of n parallel processors, each processor having a memory portion, an arithmetic unit, program decode portion, and an input/output portion. These systems were large boxes which were sometimes associated with a host mainframe. An important difference between the SIMD and the more common processors was that, within such systems all SIMD processors may have a different set of data in the associated processor, but all processors are governed by a common controller. SIMD computers are also different from a more common Von Neuman processor in that each instruction operates on a data vector rather than on a single operand.

The most common type of multiprocessor systems are Multiple Instruction Multiple Data systems where each processor may execute a separate program operating on a separate data set. The processors in a MIMD system may perform separate tasks or they may each perform a different sub-task of a common main task.

As the thinking about SIMD parallel processors progressed it was thought, as illustrated by U.S. Pat. No 4,435,758 issued to Lorie et al on Mar. 6, 1984, entitled "Method for Conditional Branch Execution in SIMD Vector Processors", that they may be appropriate if the tasks of the system to be performed are highly independent and contention-free, but if the tasks have a contention for resources, then a network of synchronous processors working in a SIMD mode may be indicated. Indeed, U.S. Pat. No. 4,435,758 described the problem and described improvements they had to make upon the developments of the R. A. Stokes et al 4,101,960 patent of Jul. 18, 1978 to provide for conditional branch execution.

It has become the norm to describe the most advanced SIMD machines as synchronous bit serial processors arranged in an NxN matrix, as illustrated by an exemplary multi-processor system described in the paper by H. Li and M. Maresca entitled "Polymorphic-Torus Network", Proceedings of the International Conference on Parallel Processing, pp 411–414. Matrix vector multiplication methods for such a massively parallel architecture as described by H. Li et al of NxN processors connected physically by a mesh topology and with a mesh network overlayed by another switching network for reconfiguration purposes was described in detail in IBM Technical Disclosure Bulletin Vol. 32, No. 3A August 1989 for improving the speed of execution in the multiplication of a sparse matrix to a vector.

There does exist a 1990 publication which shows that thought has also been given to making SIMD and SIMD/MIMD machines which operate with multiple rows of processors, where all the processors in a given row are executing exactly the same instruction, but each row is programmed differently. See the H. Li, B. Dom and R. Jaffe example in IBM Technical Disclosure Bulletin, Vol. 32, 8B, January 1990 wherein is described an architecture with this configuration which was called a Parallel Local Operator Engine (PLOE) for processing specific repetitive memory inspection functions.

This present application envisions the development of an air cooled system which can be fabricated with existing technology which can perform on a single chip with a newly established architecture the tasks which have been thought assignable to SIMD machines, as well as tasks which have thought to be assignable to Von Neumann machines.

Upon a hindsight review of background art, it will be recognized that others have described the use of a processor with a ROM for static instructions and registers for storing and accessing data on a single silicon chip, see for example the U.S. Pat. No. 4,942,516 issued Jul. 17, 1990 to G. Hyatt and entitled "Single Chip Integrated Circuit Computer Architecture", but this kind of work was unrelated to SIMD type complex applications.

Others have described various means for different tasks to which our system may also be directed. It is for instance known that matrix multiplication can be parallelized. There are publications which relate to applications to which our system may be employed which relate to Artificial Intelligence (AI). Content addressable (Refer to FIG. 3) or associative memories have been addressed at the university level with various processing chips. There it was learned that for AI applications in certain cases it is valuable to base row selection on the results of previous search operations, with row logic. See VLSI for Artificial Intelligence, Jose G.

Delgado-Frias and Will R. Moore, editors, Kluwer Academic Publishers, 1989, pp. 95–108, "VLSI and Rule-Based Systems", Peter Kogge, Mark Brule, and Charles Stormon for a discussion of applications. However, the elegant suggestions of others seem to direct the art in a different direction than we have followed. One form is that of Oxford's "Intelligent-Memory" chips for massive parallelism which was described in VLSI Systems Design, December 1988, pp. 18–28 in an article by the Senior Editor, Bob Cushman entitled Matrix Crunching with Massive Parallelism. Others have attempted parallel processing on VLSI Associative memory in order to describe a VLSI associative memory chip suitable for the implementation of a reconfigurable fully parallel associative processing scheme. This approach thought that use of a classical associative memory architecture would require an inordinate number of pinouts for the data transfers involved. See e.g. Parallel Processing on VLSI Associative Memory, S. Hengen and I. Scherson, a report supported by an NSF award #ECS-h404627 and reported by the authors at the Department of Electrical and Computer Engineering, University of California, Santa Barbara, Calif. 93106.

The problem which we have faced is the need to make compact processors for complex applications, and in approaching this general problem we have found that past designs which have been restricted to bit serial implementations with up to a few thousand bits of memory per processing element, and a few processing elements per electronic chip were inadequate. As a result we came upon the need to define an architecture which could be manufactured with dramatically higher densities and yet be suitable for an air cooled environment and could be packaged in a light and compact unit.

As a result, we came upon a solution which entails an N dimensional array of byte wide processing units each coupled with an adequate segment of byte wide memory and control logic. A partitionable section of the array containing several complete processing units are contained on a silicon chip with larger parts of the array implemented by a plurality of this single chip type, without external support chips such as memory chips. This will be described in detail below. Our own solutions generated additional problems to be solved to improve performance of the system and we have invented solutions to further the development of the propounded architecture. Some of these solutions enable independent performance of processing elements. In this connection under hindsight review we recognized that the prior art described in European Patent Application EP-A-208,457 described a processor array in which each processing element in the array was enabled to select the element from which it takes its input.

Co-Pending Application 07/519,332 of James L. Taylor, filed May 4, 1990 (now U.S. Pat. No. 4,991,933), continuing U.S. Ser. No. 07/250,595, filed Sep. 27, 1988 and entitled "SIMD Array Processor" describes a multi-dimensional array of processing elements which has an enhanced degree of flexibility to enable the potential for parallel processing to be better exploited without resorting to the expense and complexity of a MIMD processor. This application was originally first published on May 3, 1989 in the form of an European application EPO #88/307885/88-A. The system there described sends a global instruction for local bit serial execution along a bus connecting control logic in the various parallel processing elements and programmatically modifies selected bits of the global instruction for use on local bit lines where the modified bits are decoded.

Hindsight review has also identified a single discussion of byte wide SIMD processor elements entitled "Design of SIMD Microprocessor Array" by C. R. Jesshope, R. O'Gorman, et al and published in IEEE Proceedings Vol. 136, May 1989. The paper describes a scholarly study of SIMD architectures by authors who are with the Department of Electronics and Computer Science at The University, Southampton, UK. Several features are similar to the matters we discuss, and they describe a processor which has a byte wide SIMD architecture. The paper suggests processing elements with an eight bit processing accumulator architecture elements, a limited on board RAM (1 k bytes) and multiple PEs per chip (4) as well as some significant degree of local autonomy. However, in spite of the use of such a suggested structure, associative processing is not provided. It will be seen that the structure suggested does not provide byte wide neighbor communication, as is the case of the present invention, nor is a mechanism for a local autonomous operation by each picket, even when in SIMD mode. Other features which we have developed are also not suggested. Accordingly, a need exists for our Picket system which is executable on an integrated circuit chip in order to advance the state of the art for parallel processing. See—A "*Summary of Parallel Computer Architectures*", R. Duncan, which may be found in the February 1990 IEEE Computer.

DEFINITIONS

For ease in following the description, here follows a general, non-limiting description of new terminology in the art.

Picket—an element of the processing array preferably consisting of combined processing element with an ample local memory for processing bit parallel bytes of information in a clock cycle. The preferred embodiment consisting of a byte wide data flow processor, 32 k bytes or more of memory, primitive controls, ties to communications with other pickets.

Picket Chip—contains a plurality of pickets on a single silicon chip.

Picket Processor system (or Subsystem)—total system consisting of an array of pickets, a communication network, an I/O system, and a SIMD controller consisting of a microprocessor, a canned routine processor, and a microcontroller that runs the array.

Picket Architecture—the preferred embodiment for the SIMD architecture with features that accommodate several diverse kinds of problems including:
   set associative processing
   parallel numerically intensive processing
   physical array processing similar to images
   Picket Array—a collection of pickets arranged in a geometric order.

The term "picket" comes from Tom Sawyer and his white fence, although it will also be understood functionally that a military picket line analogy fits quite well.

SUMMARY OF THE INVENTIONS

The architecture which we will elaborate may be referred to as a "picket" architecture. It incorporates certain processor element structures similar in some respect to the earlier SIMD processing elements (PEs) which march together when desired like a picket line, but which have been improved and are capable of independent Von Neumann operation. This architecture has been developed to employ an N-dimensional array of processing units arranged for parallel processing and having control logic within each processing unit which we call a picket.

The preferred system is capable of computing like a Single Instruction Multiple Data (SIMD) streaming machine, but performance has been improved by more parallel processing element implementations. The problems encountered with data dependency have been eliminated. In SIMD machine operations, no processor or function can have any data dependence in it that would cause one processing element to require a different number of cycles.

The architectural developments we have made resulted in a system with a plurality of picket units, generally Pickets, having a bit parallel processing element for the local memory coupled to the processing element for the parallel processing of information in an associative way where each picket is adapted to perform one element of the associative process. We have provided a way for horizontal association with each picket. The memory of the picket units is arranged in an array. The array of pickets thus arranged comprises a set associative memory.

The invention of a set associative parallel processing system on a single chip permits a smaller set of 'data' out of a larger set to be brought out of memory where an associative operation can be performed on it. FIG. 8 diagrams how this might be done. Each of the picket's memories contains multiple entries, each of which may be multiple bytes long. An address, generated either by the external control unit, or by each individual picket, selects one datum byte in parallel out of each of these memories. This datum is then combined in the data flow with the comparison information from the control unit to perform an associative operation. This associative operation such as MATCH or WRITE as pictured in FIG. 3, which is typically an exact compare, but need not be so, is performed on the whole set of data in parallel, utilizing the Picket's memory and execution unit.

In this arrangement, the 'set' consists of all the datum read out of the picket memories at the same time. In the Picket array, each picket has a portion of data out of the larger set. Additionally, each picket selects one piece of data from it's portion. Thus, one piece of data in each of a set of pickets comprise the set of data upon which an associative operation is performed by all pickets in parallel.

The design which can be implemented today with up to 50 k gates of data-flow and control logic, and with multi-megabits of DRAM memory on a single chip. Each of these chips is configured to contain plurality of pickets or processing units. In the preferred embodiment for text processing, which is capable of graphics use, there are 16 pickets with 32 kbytes of DRAM memory for each picket on a single picket chip, and the system comprises an array of 64 of such picket chips, yielding an array of 1024 processing elements. This picket architecture may be manufactured with CMOS technology which permits 4 million bits of DRAM be laid down in repetitive patterns on a single chip, and the remaining chip surface area available on the chip is filled with logic standard cells which will employ up to 50 k logic elements and which can form the data flow and control logic in order to form pickets on the chip. We have arranged the system so that pickets may process data with local autonomy and provided a "slide" between pickets.

The picket technology is expandable, and with 128 k byte of DRAM in each single picket (16 MBit DRAM memory chip), the picket architecture will handle full 24 bit color graphics in the same manner as text and 8 bit color or gray scale graphics are handled with our current preferred embodiment. Experimental manufacturing technology shows that this density is foreseeable within the near future as a consistent manufactured product capable of operating in an air cooled environment. For color graphics, our preferred picket architecture would increase the amount of DRAM on the chip to 128 kbyte per picket, while maintaining 16 pickets per chip. Alternatively, 24 picket units per picket chip with 96 kbyte memory could be employed for full color graphics processors.

DESCRIPTION OF THE DRAWINGS

We will describe our preferred embodiment in relation to the accompanying drawings in which:

FIG. 8 illustrates set associative memory processing

DETAILED DESCRIPTION

Figure 1:
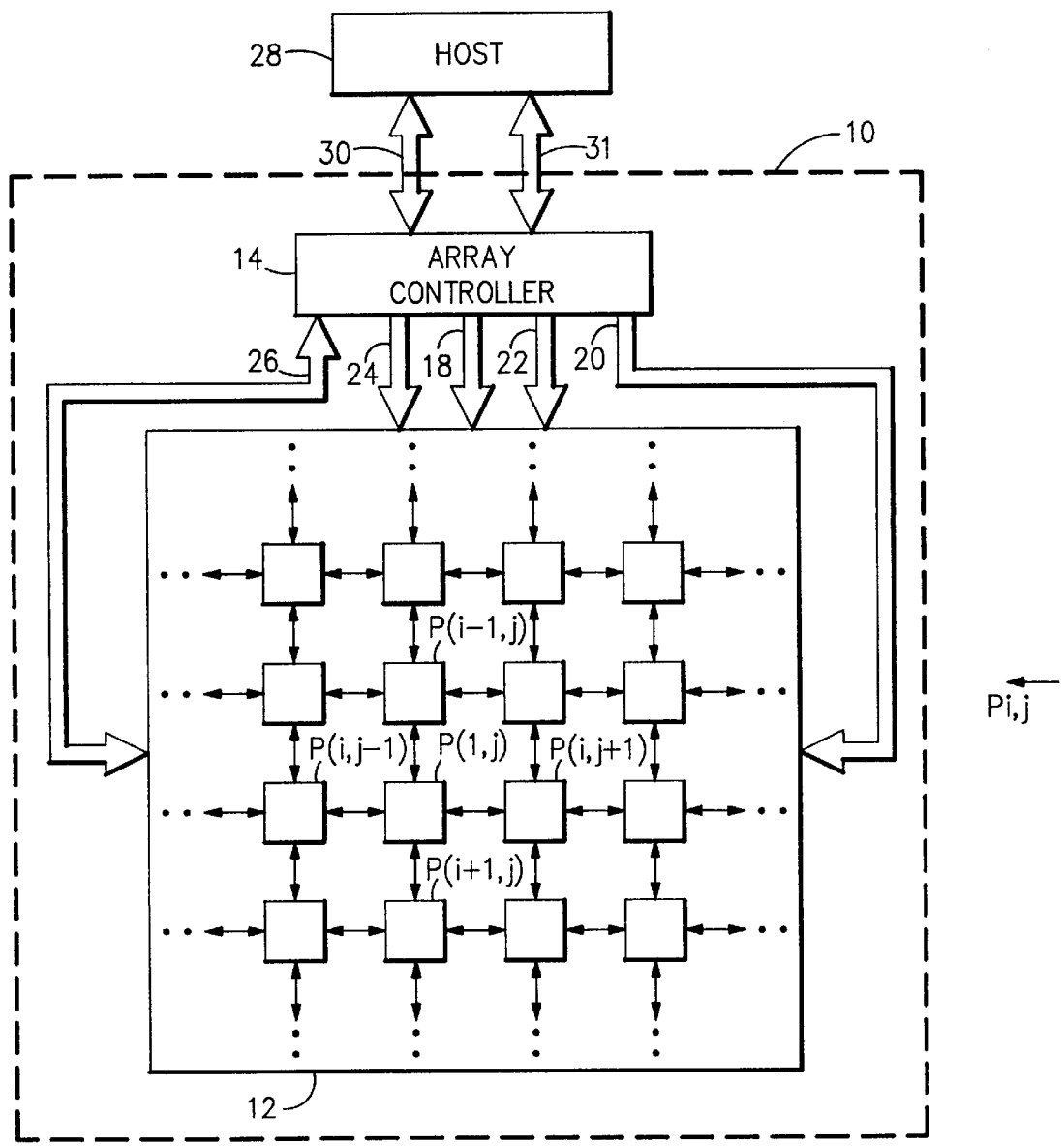
FIG. 1 is a schematic illustration of a recent SIMD processor which is described in a copending application which may be considered as representative of the prior art.

Turning now to the drawings in greater detail, it will be recognized that FIG. 1 represents a typical prior art SIMD system, of the type generally described in Taylor's IBM European Patent Application No. 88307855/88-A and in UK-A-1,445,714. In such prior art devices, the SIMD computer is a single instruction, multiple data computer having a parallel array processor comprising a plurality of parallel linked bit serial processors each being associated with one of a plurality of SIMD memory devices. The input/output I/O system acts as a staging system to the SIMD unit, and comprises a temporary store for the bi-directional two-dimensional transfer of data between the host computer (which may be a mainframe or a microprocessor) and the SIMD computer. The I/O system includes input output processing means for controlling the flow of data between the host computer and the temporary storage means and for controlling the flow of data between the temporary store and a plurality of SIMD memory devices which are usually organized buffer sections or partitions of a larger memory. Thus the input operation of the I/O system involves the transfer of data from the host computer memory to the temporary store and from the temporary store to the SIMD memory devices in the second step, and for output there is also a two step process which transfers across the two dimensional bus the data between the host computer and the SIMD computer. The input/output system for I/O transfer may be a separate unit, a sub-unit in the host, or often a unit within the SIMD computer where the SIMD controller acts as the control for the temporary I/O buffer store.

The SIMD computer itself comprises a processor array having a plurality of processing elements and a network which connects the individual processing elements and a plurality of conventional separate SIMD memory devices. The SIMD computer is a parallel array processor having a great number of individual processing elements linked and operated in parallel. The SIMD computer includes a control unit that generates the instruction stream for the processing elements and also provides the necessary timing signals for the computer. The network which interconnects the various processing elements includes some form of interconnection scheme for the individual processing elements and this interconnection can take on many topologies such as mesh, polymorphic-torus and hypercube. The plurality of memory devices are for the immediate storage of bit data for the individual processing elements and there is a one-to-one correspondence between the number of processing elements and the number of memory devices which can be the aforementioned buffer partition of a larger memory.

For example, as illustrated in FIG. 1, there is provided a host processor 28. This processor is used to load microcode programs into the array controller 14 (which includes a temporary store buffer) to exchange data with it and to monitor its status via a host-controller data bus 30 and an address and control bus 31. The host processor in this example could be any suitable general purpose computer such as a mainframe or a personal computer. In this prior art example, the array of processors of the array are illustrated as on a 2-D basis, but the array could be organized differently, as on a 3-D or 4-D cluster arrangement. The SIMD array processor comprise an array 12 of processing elements P(i,j), and an array controller 14 for issuing the stream of global instructions to the processing elements P(i,j). While not shown in FIG. 1, the prior example has processing elements which operate on a single bit at one time and has associate there a block of storage which is a partition in memory associated with the processing element. The processing elements are connected by a so called NEWS (North, East, West, South) network to their respective neighbors by bi-directional bit lines. Thus, the processing elements P(i,j) is connected to the processing elements P(i–1,j), P(i,j+1), P(i,j–1), and P(i+1,j) in the Northern, Eastern, Western and Southern directions respectively. In this typical example, the News network is toroidally connected at its edges so that the Northern and Southern Edges are bidirectionally interconnected and the Western and Eastern edges are similarly interconnected. In order that data may be input to and output from the array of processors, a controller-array data bus 26 is connected to the NEWS network. As shown it is connected to the East-West boundary of the array. It could be connected instead or additionally to the North-South boundary by means of bidirectional tristate drivers which are connected to the toroidal East-West News connection. As in the preferred embodiment which will be described, 1024 processing elements would be achieved by the prior art if the number of processing elements were in this example 32×32 instead of the illustrated 16×16. In the illustration a single line indicates a single bit line, while a double line connecting functional elements is used to represent a plurality of connection lines or a bus.

In this prior example the array controller issues instructions in parallel to the processing elements via an instruction bus 18 and issues row select and column select signals via row select lines 20 and column select lines 22, respectively. These instructions cause the processing elements to load data from storage and to process the data and then to store the data once more in storage. For this purpose each processing element has access to a bit slice (section or buffer) of main memory. Logically therefore, the main memory of the array processor is separated into 1024 partition slices for a 1024 processing element array. This means that the equivalent of up to thirty-two 32 bit words can be transferred in or out of storage at one time in a transfer step if each PE were 1 bit wide. To perform a read or write operation, the memory is addressed in terms of an index address which is supplied to the memory address lines via an address bus 24 and read or write instruction is supplied to each of the processing elements in parallel. During a read operation, the row and column select signals on the row and column select lines identify which is the processing element that are to perform the operation. Thus in the described example, it is possible to read a single 32 bit word from memory into the thirty-two processing elements in a selected row when the array is 32×32. The processing element is associated with the slice, or block of memory (i,j) which is one bit wide. While the slice or block memory is logically associated on a one-on-one basis with the associated individual processing element it may be and typically is physically separated on another chip. We do not know how with this prior architecture the described array processor could be manufactured, as can our picket be manufactured with an array of processors and adequate memory on a single chip of the kind we describe below.

Processing elements P(i,j) of the prior example themselves should be understood to comprise an ALU, with input and output registers which will include a carry, each of which is able to store a single bit of information. There is a multiplexer which is connected to the ALU input, output and also to the bidirectional data port of the slice of memory (i,j) associated with the individual processing element P(i,j).

There are separate instruction and data busses, and the array controller has a microcode store in which the microcode defining the processing to be performed by the array is loaded by the host 28 using the data bus 30 and the address and control bus 31. Once the operation of the array controller has been initiated by the host 28, the sequencing of the microcode is controlled by the microcode control unit which is connected to the microcode store within the array controller 14. An ALU and register bank of the array controller are used in the generation of array memory addresses, loop counting, jump address calculation and general purpose register operations which are output on an address bus of the array controller. The array controller also has mask registers for decoding row and column mask codes, and the specific operation codes pass to the processing elements over an instruction bus. In this example the array controller could have a data buffer within the controller but functionally between the host controller data bus and the controller array data bus. From this buffer the data is loaded under control of the microcode in the control store into the array of processors, and vice versa. For this purpose the buffer is arranged as a bidirectional FIFO buffer under control of a microcode control in the array controller. More details of such prior systems may be found by reference to the above cited examples, particularly in Taylor's SIMD Array Processor, U.S. Ser. No. 07/519,332.

Figure 2:
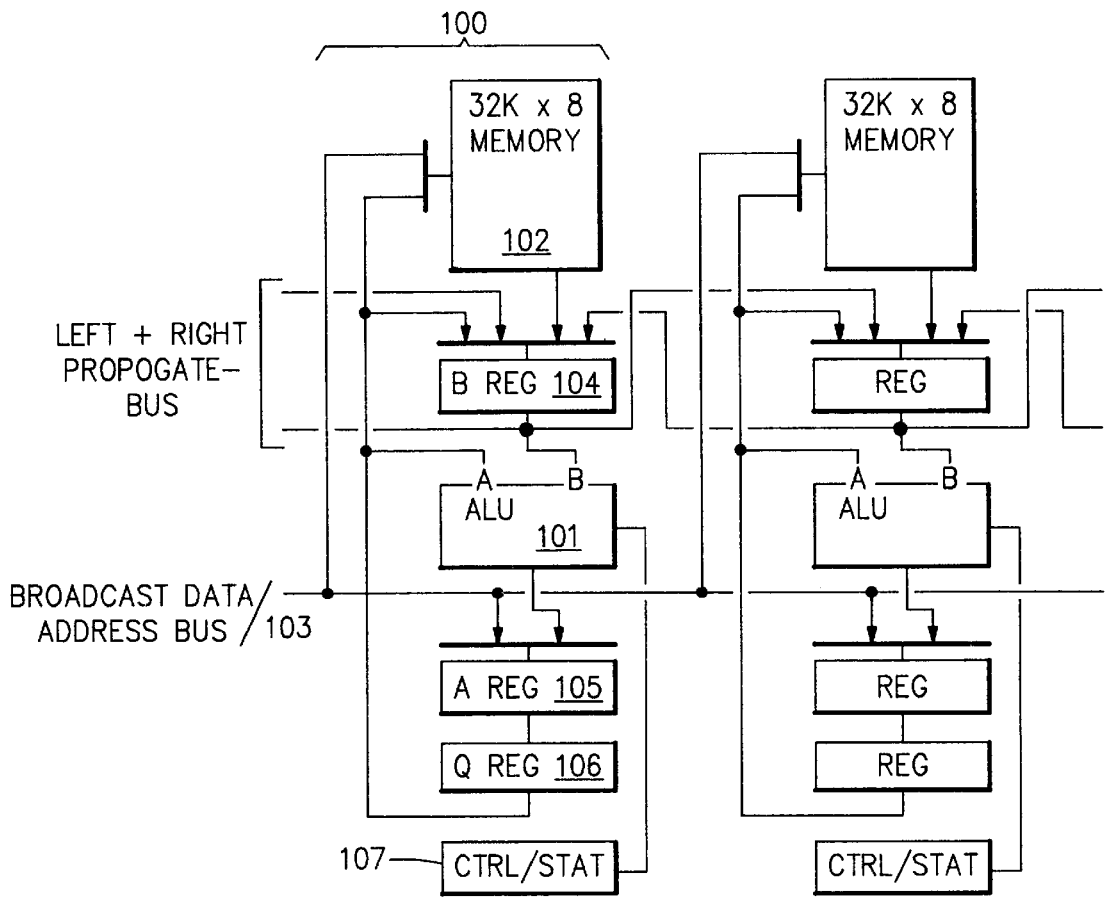
FIG. 2 illustrates a pair of the basic picket units which are configured on a silicon base with processor, memory, control logic and associative memory with byte communication with the other pickets in the array.

A review of the foregoing prior attempts may be compared to the preferred embodiments of the inventions described herein. FIG. 2 illustrates the basic picket unit 100, comprising a combined processing element ALU 101 with a local memory 102 coupled to the processing element for processing one byte of information in a clock cycle. As illustrated, the picket unit is formed on a silicon base chip or Picket Chip with a linear array of Pickets with neighbors to the side (to the left and right in the figure) such that on a silicon base chip there is formed a picket processing array with a plurality of local memories, one for each of the byte wide processing data flows arranged in a logical row or in a linear array with neighbor communication busses for passing data bidirectionally to the right and left. The collection of pickets in a Picket Chip is arranged in a geometric order, preferably horizontally on the chip. FIG. 2 shows the typical implementation of two pickets of the picket array on a picket chip with multiple memory and dataflow including communication paths between each picket's processing element and memory. In our preferred embodiment, the data communication paths between the one-on-one memory with the processing elements of the array is byte wide and across, left or right with a neighbor or with a "slide" for communication with picket processors farther away.

A "slide" may be defined as means for transferring information in a single cycle to a non-neighbor position through a picket address location which would normally be able to receive the information were it not transparent to the message being sent until it arrives and is received at the nearest active neighbor which receives it. This 'transparency' is obtained by appropriate design of the B Register 104 in FIG. 2, whereby in non-transparent mode it latches whatever data is fed into it and in transparent mode, it simply passes it's input data through to it's output without latching or stopping it until the next clock cycle. Thus a slide functions by sending information to a non-neighbor position across "turned off" pickets. Say picket "A" wants to transfer information to a remote picket "G". Prior to that cycle, intervening pickets are made transparent by turning these "B" through "F" pickets off. Then in the next single cycle "A" sends his message to the right and in doing so passes through "B" through "F" which are transparent because they are turned off and "G" receives the message since it is still turned on. In the normal use of the "slide" information is transferred linearly across the lattice, but the slide approach can also work with a two dimensional mesh, or in a multi-dimensional array.

The access of the processing elements in our preferred embodiment is not bit serial in operation, but rather byte serial. Each processor has access to its own coupled memory, rather than having access to a block of local memory and an associated partition or page thereof. Instead of one bit, a character wide, or character multiples wide bus is provided. Instead of a bit, a byte (or in future systems envisioned to duplicate the performance of a character byte, multiple bytes) of information is processed in one clock cycle. Thus, 8, 16 or 32 bits may flow between each picket processing element to match the width of the associated memory. In our preferred embodiment each picket chip has 8 (9with parity) bits wide memory of 32 Kbytes and preferably 16 pickets with this 32 Kbytes each of storage per picket node of the linear array. In our preferred embodiment, each associated memory is founded in CMOS as DRAM, and a character byte is 9 bits (which functions as an 8 bit character with self checking).

The parallel path byte wide bus data flow between pickets and between the processing element and its memory is a substantial improvement over the serial bit structure of the prior art systems, but it will also be recognized after this achievement is recognized that the increased parallelism results in additional problems which need solution as one grows into the understanding of the implications of the newly achieved architecture. Important solutions are described herein.

A feature which will be appreciated is that in addition to the left and right neighbor transfers, and the slide mechanism which we have described with reference to the drawings, we have provided also a broadcast bus which is double byte wide, so that all pickets can see the same data at the same time. Picket control and address propagation is also transferred on this broadcast bus. It is this bus that supplies the comparison data when performing set association operations, and other comparison or synchronous math operations.

The tasks that have highly parallel data structures that lend themselves to processing within the picket data processing elements under the control of a single instruction stream include applications in artificial intelligence pattern matching, sensor and track fusion in multi-sensor optimal assignment, context searching and image processing. However, many of these applications now possible were not used in SIMD processes because the serial bit processing under a single clock time. For example, the traditional serial processing element of a SIMD machine executes one bit of an ADD operation for each processor cycle, while a 32 bit parallel machine can execute 32 bits of an ADD in one cycle.

The configuration of 32 KB per processing element applies far more memory logically available to each processing element than the traditional 1 bit wide SIMD machine provides.

Pin count on the chip has been held low because the data which is passed into and out of the chip has been kept to a minimum. The on chip DRAM is a conventional memory CMOS array and one that supports "row-column" access by deleting the column demultiplexing on the back of the memory array, and providing a row address that reads out a row of the memory array to the data flows in parallel.

The memory, in addition to data, can contain "tri-bits" or "trit", so that there are three states recognized by the logic, instead of the traditional binary digit, either logic 1, logic 0, or don't care. The don't care in a match field matches either a logic 1 or logic 0. The trit is contained in successive storage locations in the storage array. Masks are another form of data stored in memory that is directed to the mask register of the picket processing element.

As the storage array can contain commands, this allows one picket to do a different operation from another picket. On-chip control of individual pickets during operations involving most pickets, but not necessarily all, allows implementations which are unique for SIMD operations. One simple control function provided is that of suspended operations in any picket whose status output meets a specific condition. Thus a non-zero condition may mean a doze. Doze is a condition which suspends operations and turns the picket into an inactive but aware status. Another command provided is to inhibit or enable write to memory based on conditions in the picket, or based upon a command provided to the bus prior to a slide operation. A third, and novel way of having the storage array contain commands is to provide 2 paths to the elaboration of instruction decode logic in each picket. One is from the broadcast bus and is used for normal SIMD operations, however, a secondary path may be from one of the picket's data flow registers which may be loaded from the picket's own local memory. Thence, when the SIMD controller broadcasts a "do local operation" command, the operation performed by each picket is whatever is in this local register, and may be radically different for each picket. It can be seen that making each picket 8 bits or larger wide enhances this ability by permitting the loading and storing of these local commands in simple one cycle operations.

By applying to a picket chip 16 powerful pickets each with 32 KB memory, only 64 chips provides 1024 processors and memory of 32768 KB. The array of pickets comprises a set associative memory. The inventions are also useful for numerically intensive processing image analysis as well as vector processing. This powerful picket processing array can be packaged today on only 2 small cards! It will be seen that thousands of pickets can be appropriately packaged in a more portable low power package, enabling image processing applications to be performed with minimal delay or within video frame time, for instance, during the flight of an airborne craft without significant payload consideration.

The power of the pickets leads to the possibility of use of large associated memory systems packed into close quarters and enables the use of the processing power in a variety of applications after the systems designer becomes accustomed to use of the new system.

Figure 3:
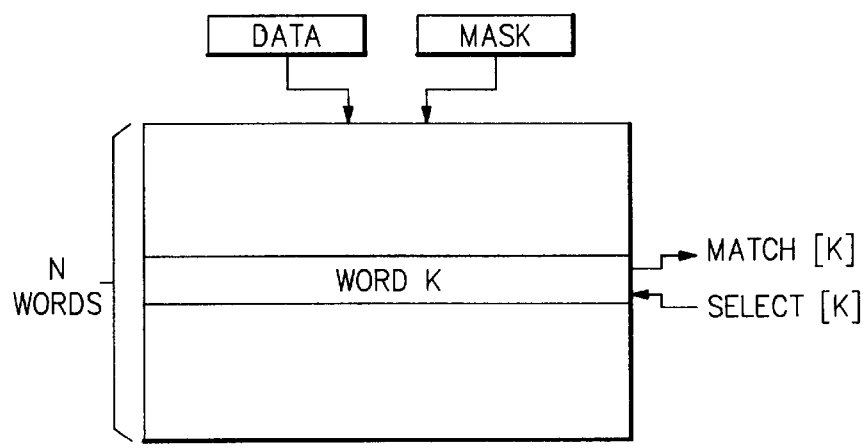
FIG. 3 illustrates associative memory processing.

FIG. 3 illustrates what might be termed fully associative memory in that, when an association is requested, a compare value is presented to all memory locations and all memory locations with matching data simultaneously respond with their match lines. Associative memory is known by itself in the art. In the system herein described, using parallel pickets of memory and processing elements which have byte transfers in order to perform a search, there is an input of data and a mask for a search in order to locate a word K among N words in memory. All matching pickets raise a status line, and then a separate operation reads or selects the first match K. This operation, commonly called set associative, can be repeated for successive words up thru the picket memory. Similarly, writing is achieved via a broadcast operation in which a raised select line indicates participation and broadcast data is copied to all selected pickets.

Another embodiment, although not the preferred one reduces the amount of DRAM memory available for each picket to allow inclusion of a section of fully associative memory of the type portrayed in FIG. 3. If say 512 bytes of fully associative memory were included, then every picket could contain a set of search indexes and in a single operation, 512 times 1024 pickets yields 512 compares per operation or 512 Gig-compares per second at one microsecond per operation. With extensibility, the concept can be advanced into the multiple Tera-compare range. This embodiment empowers associative tasks that involve extensive searching for information with capabilities well in excess of computing capabilities today.

The local operation capability discussed earlier allows this associative type operation to be expanded on beyond the current practice. Each picket can hold within it, it's own mask and comparison operator, and upon broadcast of a "do local operation" from the control unit, can do an entirely different compare than any of the other pickets, but simultaneously with them. This allows the implementation of the "trit" operation discussed above without implementing ternary logic in the picket.

When this association operation using memory and byte wide coupled processing elements, as illustrated in FIG. 2, in addition to the applications of distinct algorithms or operations, artificial intelligence, and parallel programming attempted in SIMD situations, there are many additional applications now available for the machine with the configuration of the chip we describe in a SIMD environment which may include:

Simple parallelizable arithmetic tasks, including matrix multiply and other tasks which can be performed in specialized memory machines;

Image matching, and image processing tasks which can be performed in Von Neumann machines but which can be speeded up considerably with the applications adaptable to the extreme parallelism, for instance pattern matching of a three dimensional image;

Data based query functions;

Pattern matching in the Artificial Intelligence arena, particularly when there is an array of patterns, each different, which is to be compared against new facts broadcast to all patterns, such as found in various forms of rule based processing.

Network control in bridges to rapidly identify messages that go to a user on the other side of a bridge of a network;

Gate level simulation;

and checkers for VLSI ground rules violations.

Process tasks which take advantage of the bank of memories and associated processing elements will occur to application programmers as they invent to take advantage of the power of the new system architecture.

A process of keeping a description of a digital system can be enhanced by the use of the array to one gate or logic element per picket 100. In such as system, the process would begin by assigning each gate description as a list of signals that the gate accepts as inputs and naming the signal it generates. Require that each time a signal changes, its name is broadcast on bus 103 to all pickets and is compared in parallel with the names of expected input signals. If a match is found, record in the picket a new value of the signal in a dataflow register bit. When all signal changes have been recorded, cause all pickets to read out in parallel a local control word which tells their data flow how to use the current set of inputs to compute the output. Cause these computations to be performed in parallel using the local operation mode, with the results compared with the old value from the local gate. Record in a dataflow status bit all of those gates of the pickets whose outputs change. Cause an external controller to interrogate all the pickets and ask for the next gate that changed. Then broadcast the appropriate signal name and value from the picket to all other pickets, as originally stated, and repeat the cycle until no more signal changes occur or the process is stopped.

Another process would be a dictionary name search. Names are stored in picket memory 102 such that the first letter of all names can be compared with that of the desired broadcast name on broadcast data address bus 103. All pickets without a match are turned off with the control characteristic we provide. Then the second letter is compared and the compare and turnoff procedure is repeated for successive letters (characters) until no active picket units remain or the end of the word has been reached. At this point the remaining picket units are queried, and the index of the desired data is read out by the sequencer.

Figure 4:
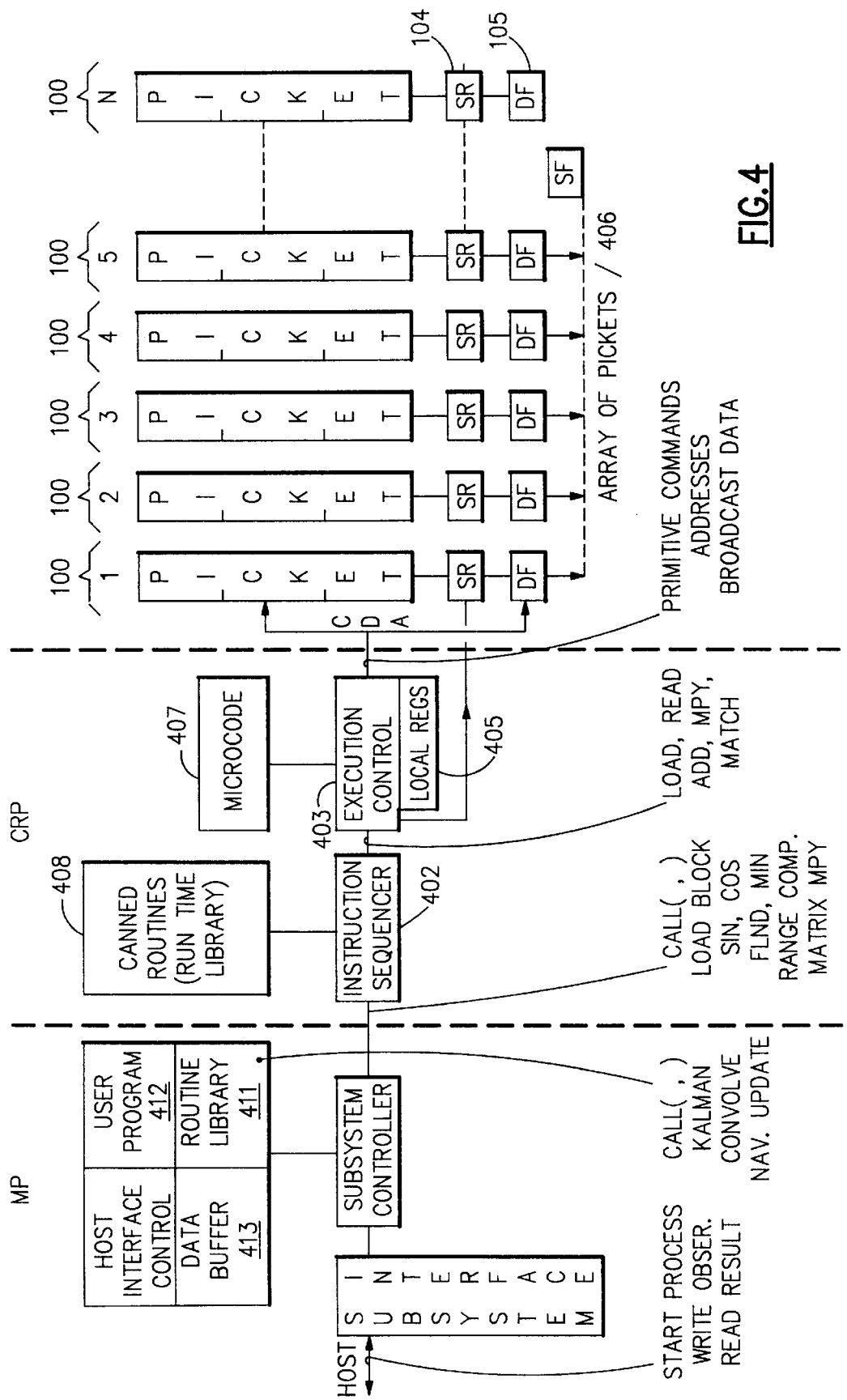
FIG. 4 illustrates a basic 16 (n) picket configuration for a SIMD subsystem which employs a microprocessor controller, a hardwired sequencing controller for canned routines, and a picket array and which forms the basic parallel picket processor system which may also be a stand alone unit.

FIG. 4 illustrates a basic picket configuration of a plurality of parallel processors and memories, picket units, arranged in a row on a single silicon chip as part of a parallel array which may be configured as a SIMD subsystem, illustrating the control structure of such a system. Therein also is illustrated the control processor and the supervisory microprocessor. In FIG. 4, there is illustrated memory and parallel processing element logic on the same chip which within the FIG. 4 are shown in the section labeled Array of Pickets. Each memory is n bits wide, preferably a character wide, 8 (9) bits, as we have said, but conceptually also having a word width of multiple bytes wide memory. Thus, the memory portion of the parallel picket processor element will be preferably 8 (9) bits wide, or alternatively, 16, or 32 bits wide. With current CMOS foundry technology, we prefer to use an 8 bit or character wide associative memory (9 bit wide byte with self checking) with each picket processing element. The memories are directly associated one-on-one with a coupled processing element which includes an ALU, mask registers (A & Q used for masking), and a latch 104 (SP in FIG. 4), as well as status registers 107 and data flow registers A 105 and Q 106 (DF in FIG. 4) which are illustrated in greater detail in the Picket diagram of FIG. 2. The DRAM and logic of each picket processor do not have any burden of an interconnection network to contend with, for there is a direct one-on-one association between the multi-bit wide DRAM memory and its processing element on the chip itself.

It will be noted in FIG. 4 that the slide B register latch (SR) 104 is placed logically between the memory and the associated logic of the ALU of the processing element, and the latch becomes in essence a coupling port for each processing element along the picket array. Each picket chip comprises a plurality of parallel picket processing elements arranged in a line (which is illustrated as a straight bus) for communication with the picket control. A vector address bus is common to the memory, and a data vector address register controls what data passes across to each memory.

FIG. 4 also illustrates the interconnection between the main or microprocessor card MP which in our preferred embodiment is a 386 microprocessor configured as a PS/2 system with a subsystem controller through which global instructions pass to a canned routine processor (CRP) which we have provided which provides the instructions for an instruction sequencer 402 and execution control 403 which executes the specific microcode called for by the instruction sequencer. This instruction sequencer might be analogized to a controller in function. However, also within the canned routine processor CRP we have provided local registers 405 which together with the local regs ALU (not shown) provide the basis for all addressing that is broadcast to all of the pickets within the picket array 406. In this way, address calculations are performed for all of the pickets in one ALU without using picket resources or conceivably without using picket execution cycles. This important addition adds control flexibility to the picket array, permitting doze, inhibit, and other control functions for specialized tasks to be performed and permitting pickets to be separated from any broadcast instruction or data function.

The instruction sequencer 402 with the loaded microcode 407 broadcasts to the array of pickets for execution under the SIMD instruction sequence determined by the main program microprocessor MP and by the canned routines of the canned routine processor CRP run time library 408 to enable SIMD processing of data contained in the array of pickets.

The instructions provided to the microprocessor MP via the subsystem interface are conceived to be high level process commands that might include Start Process, Write Obser. and Read Result which are passed to the microprocessor by the Subsystem controller of the microprocessor MP. The microprocessor can be considered as the main system or control processor in the subsystem arrangement illustrated in FIGS. 4, 5, 6 and 7. It will be understood that this unit could also be a stand alone unit with the addition of a peripheral input device (not shown) such as a keyboard and display unit. In this stand alone configuration the system MP could be considered to be a commercial PS/2 to which cards which include the sequencer card (which configures the canned routine processor) and the processor array cards are inserted along the lines illustrated in FIG. 7. The routine library 411 can contain routine sequences for overall control of a process, such as CALL (,); Kalman, Convolve, and Nav. Update. The selection of these routines is via the user program, and thus the overall processing can be under the control of an external host or under control of the user program 412 located in the MP. A data buffer 413 is provided in MP memory for data transfers into and out of the parallel picket processor system. The instruction 402 sequencer is configured to execute the control stream from the MP as well as the canned routines that reside in the canned routine run time library memory 408. Some of these routines include CALL (,), Load Block, Sin, Cos, Find, Min, Range Comp. and Matrix Multiply from canned routines provided by the canned routine runtime library 408.

Within the CRP is also microcode 407 for the execution control of lower level functions like Load, read, Add, Multiply, and Match functions.

We prefer and provide an external FOR/NEXT control for each processing unit. We also provide a deterministic floating point byte normalize implementation.

The use of a deterministic approach to macro development for the system, which we have provided, permits picket grouping and GROUP control. A local doze function is provided to accommodate individual picket processing variations.

Should the user program require execution by the array of processors, primitive commands, addresses and broadcast data is provided to the array of picket processors.

The particular function which each part of the system utilizes is determined by the task to be performed, and assigned during compilation of the user program.

The flexibility of the subsystem may be illustrated by a rather common problem. Take for example a matrix multiplication problem . . . [x]*[y]=[z].

This would be described as the problem of:

```
| x(1)   x(R+1)  ...        |              |  y(1)   y(M+1)  ...          |
| .      .                  |              |  .      .                    |
| .      .                  |   X          |  .      .                    |
| .      .                  |              |  .      .                    |
| x(R)   x(2R)   ...  x(RxM)|              |  y(1)   y(M+1)  ...  y(MxC)  |  (MxC)
                             (RxM)

|  z(1)   z(R+1)  ...          |
              =              |  .      .                    |
                             |  .      .                    |
                             |  .      .                    |
                             |  z(R)   z(2R)   ...  z(RxC)  |
                                                              (RxC)
```

Which would be solved by the following statement adjacent which is illustrated the number of passes and number of clock cycles per pass is stated offered by way of example.

|    |                                         | passes | cycles/pass |
|----|-----------------------------------------|--------|-------------|
| 01 | Call Matrix Mult Fx (R, M, C, Xaddr, Yaddr, Zaddr) | 1 | c |
| 02 | xSUB = ySUB = zSUB = 1                  | 1      | 3           |
| 03 | DO I = 1 to C                           | 1      | 3           |
| 04 | DO J = 1 to R                           | C      | 3           |
| 05 | Z = O                                   | CxR    | 5/6*        |
| 06 | DO K = 1 to M                           | CxR    | 3           |
| 07 | *Assign to associative parallel processor* | | |
| 08 | Zz = Xx x Yy + Zz                       | CxRxM  | 204/345*    |
| 09 | *Return result*                     |        |             |
| 10 | xSUB = xSUB + R                         | CxRxM  | 2           |
| 11 | ySUB = ySUB + 1                         | CxRxM  | 2           |
| 12 | NEXT K                                  | CxRxM  | 3           |
| 13 | xSUB = xSUB − MxR + 1                   | CxR    | 2           |
| 14 | ySUB = ySUB − M                         | CxR    | 2           |
| 15 | zSUB = zSUB + 1                         | CxR    | 2           |
| 16 | NEXT J                                  | CxR    | 3           |
| 17 | xSUB = 1                                | C      | 2           |
| 18 | NEXT I                                  | C      | 3           |
| 19 | END Call                                | 1      | 1           |

Note * Fixed Point (4 byte)/Floating Point (1+4) Byte)

From a review of the above example, it will be seen that the task identified by the above statement 08 requires about 98% of the cycle time. Accordingly, it is assigned to the SIMD organization of the parallel picket processor. The other processes take only 2% of the cycle times, and are maintained in the architecture within the microprocessor.

Accordingly, a review of this Example of matrix multiplication would be assigned for execution (and each statement upon compilation would cause execution in a specific system location) to either the MP, The CRP, the LR, or to the Picket array.

In the above example of matrix multiplication, the statement 01 would be assigned to the main processor MP, while statements 02, 05, 10, 11, 13, 14, 15, and 17 would be assigned to the local registers LR, while statements 03, 04, 06, 12, 16, 18, and 19 would be assigned for execution within the canned routine processor CRP, with the otherwise time consuming matrix processing thus assigned for execution under the single instruction to the array of pickets with assignment of the statement 08 to the array of pickets.

Figure 5:
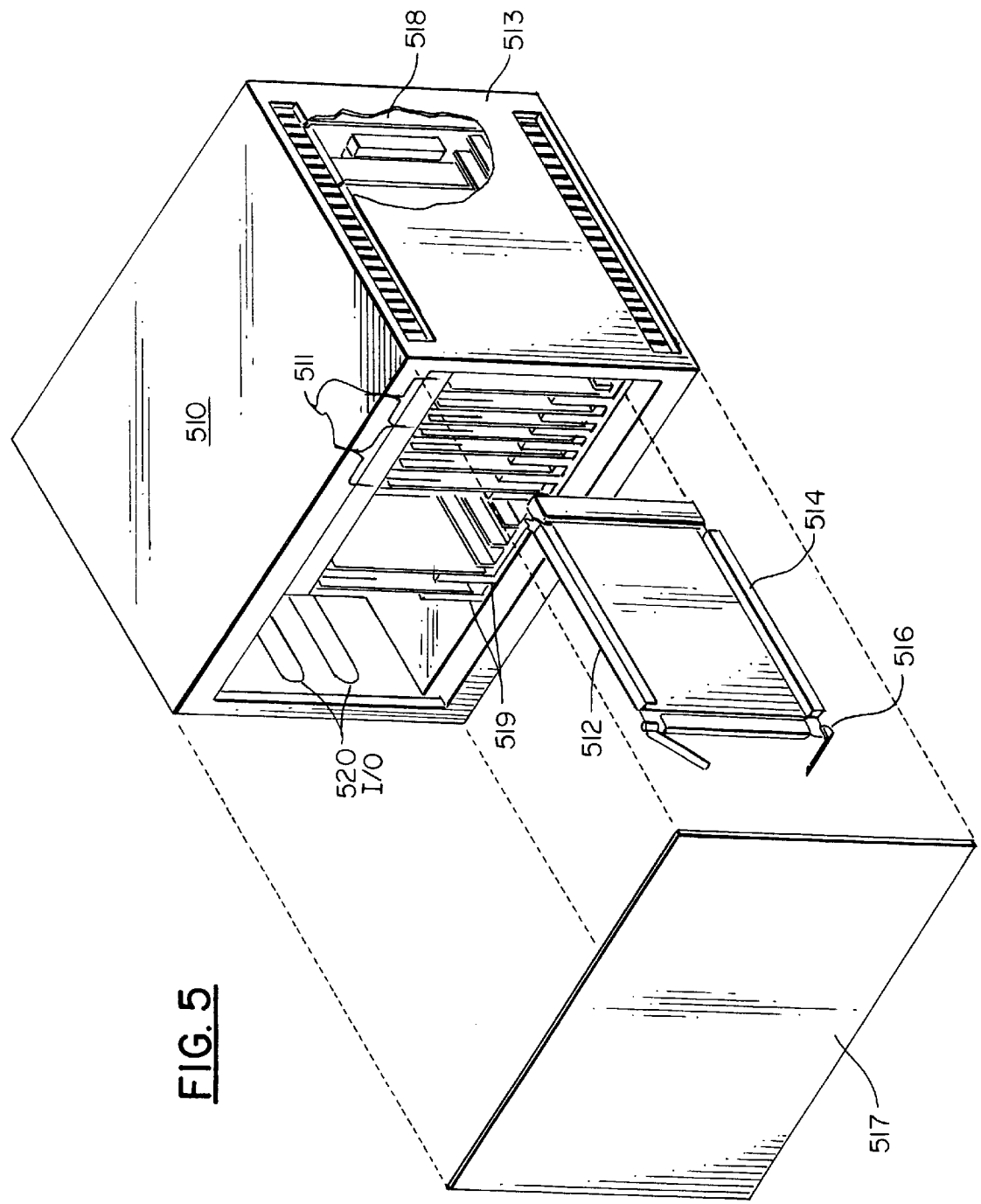
FIG. 5 illustrates a multiple picket processor system which incorporates a plurality of picket processors of FIG. 4.

FIG. 5 represents a multiple parallel picket processor system 510 which incorporates a plurality of parallel picket processors. For applications such as multiple target tracing, sensor and data fusion, signal processing, artificial intelligence, satellite image processing, pattern/target recognition, Reed Solomon encode/decode operations, we have created a system which can be configured in a preferred embodiment as a SIMD system with 1024 parallel processors with two to 4 SEM E cards 511 (here represented as 4 cards per system) for each 1024 processors. The individual cards 512 are insertable in the rack mount system compartment 513 with wedgelock slides 514 and the cards are provided with insertion/extraction levers 516 so that when the cover 517 is closed it effectively encloses a mountable system in a rack with 32 or 64M byte storage, with a performance capability of approximately 2 billion operations per second. The System is compact, and an array of a plurality of pickets is plugged into a backpanel board 518 which has logic thereupon which allows interconnection of a plurality of cards. The processor with 32M byte storage is formed on 4 SEM E cards, and the system weighs only about 30 pounds. Power is provided by power supplies 519 as illustrated. Power requirements for the air cooled processor of such power is estimated to be only about 280 watts. Each SIMD system has two I/O ports 520 for channel adapter communication to associated mainframes or otherwise to the rest of the world. With the illustrated multiple parallel picket processor each consisting of 4 logic pages and using standard modular avionics packaging and bus structure for attachment to an external memory (e.g. PI, TM and IEEE 488 busses), the processor may attach via the I/O port to the memory bus of a mission processor and may be viewed as an extension of a mission processor memory space.

With the illustrated multiple parallel picket processor comprising 1024 parallel processing elements, each processor has 32 kbytes of local memory and the associated path to the picket parallel processor is 8 bits or character wide (9 bit) parallel.

Processors within each picket exchange data with other neighbor processors and between pages via a backplane interconnection network, preferably a crossbar, but alternatively a Slide Crossbar, a Shuffle Network, a Base 3 N-Cube or a Base 8 N-Cube.

Figure 6:
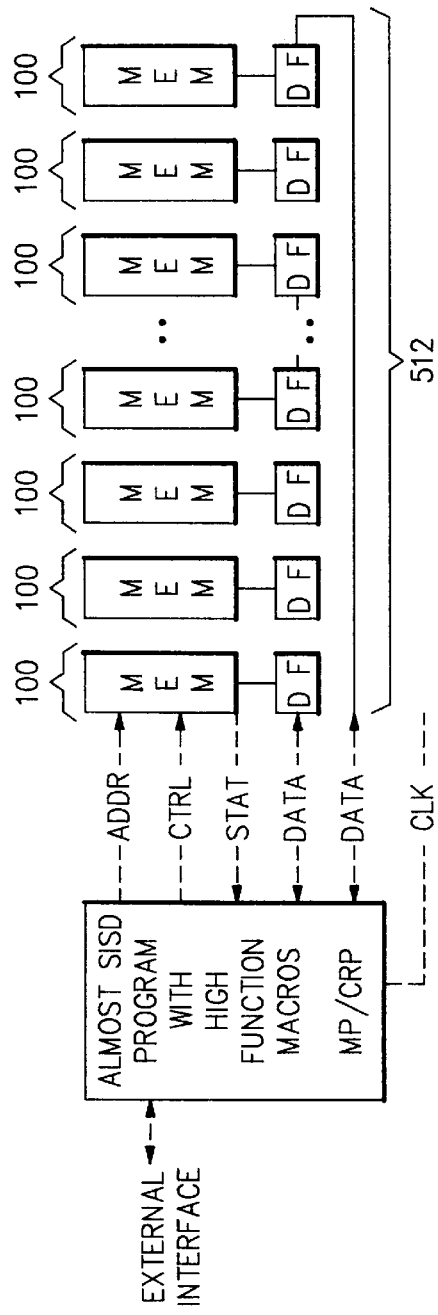
FIG. 6 is a sub-system functional block diagram.
Figure 7:
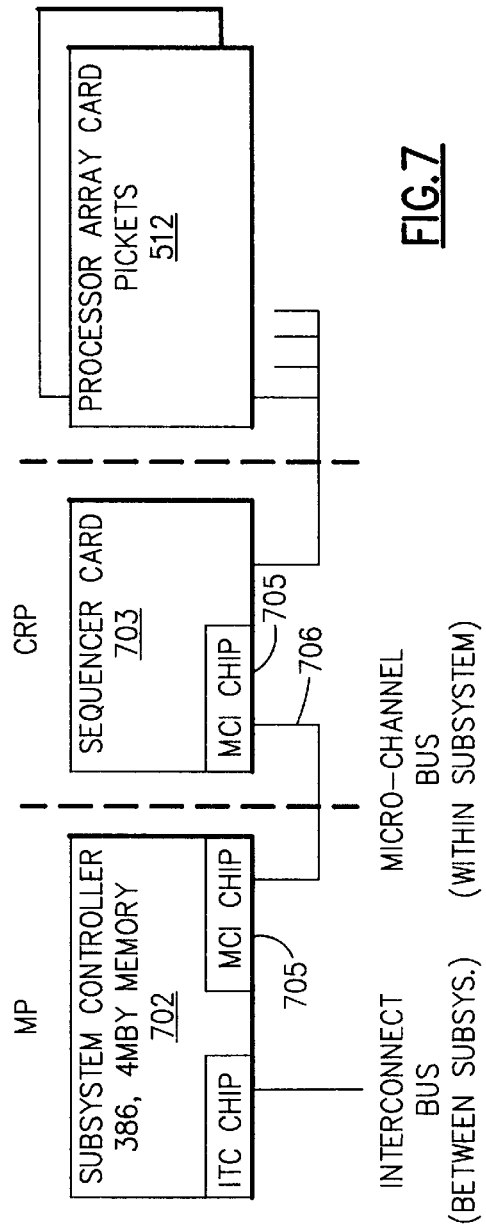
FIG. 7 further illustrates a subsystem controller's arrangement with the cards of FIG. 5.

Individual picket processors of the system are contained within a two card pack of the four cards, and the PS/2 microprocessor on one card, while the canned routine processor sequencer is contained on the other of the four cards which comprise the System schematically illustrated in FIGS. 6 and 7. Individual pickets 100, or cards of pickets 512 can be configured on the fly with the canned routine processor CPP to enter or can drop out of operations based on data conditions as controlled by the latch 104 architecture and the local registers 405 which are coupled to the execution control of the sequencer card CRP 703. Thus, picket processors can independently perform the alignment and normalization operations which are associated with floating point operations.

Processors are controlled in parallel by a common sequencer as described herein. The sequencer card 703 contains the controller CRP of the picket processor and may cause the picket process to execute a single thread of instructions, coded to execute on the array of SIMD processors in byte sequential fashion similar to classical bit serial processing as well. The controller has three layers. Micro-control for the pickets is microcoded similar to modern processors, and is transferred in parallel to all of the pickets. The Microcontrol and the Pickets are synchronized to the same clock system CLK, so that the functions controlled by the sequencer can be executed in the same clock time. Feeding commands to the micro-control sequencer is the function of the canned routine processor. This sequencer card 703 is a hardwired controller that during most functions executes loop control commands, and recursively starts new micro-control sequences. This controller with its canned routine library 408 and with its looping function keeps the pickets well fed, and not command bound. The canned routine processor controller CRP contains a large collection of macros that are called by the main system, which in the sub-system acts as a primary supervisory picket controller. This is the top control system of the picket array. It is a 386 microprocessors that manages the activity of the array of pickets. At a given moment all pickets of the array may execute the same instruction, although subsets of processors may react individually to the control flow.

There are several variations of the individual reactions, so that local autonomy, by virtue of the byte control function for each picket (dose, inhibit, etc.) there is local autonomy which programming may take advantage of and which may be made under control of the system during compilation of a program.

In addition, as has been described, there is local memory addressing autonomy. The SIMD controller sequencer supplies a common address for all of the pickets to use. Each picket can augment that address locally to enhance it's ability to do data dependent memory accesses.

In addition, a picket can participate or not participate in the array activities, depending on local conditions.

With this characteristic, it is now possible to introduce the concepts of groups to SIMD processing, by providing a means for each picket to assign itself to one or more of several groups, and processing can proceed based on these groupings, where a change of configuration can happen essentially on-the-fly. In one embodiment, only one group or combination of groups can be active at one time and each executes the same SIMD instruction stream. Some operations require only working with a subset or group of pickets. Programming can take advantage of this capability. Local participation autonomy is geared to work that way. Obviously, the more pickets that are computing the better.

One way to increase the number of pickets that are participating is to allow each picket to execute it's own instruction stream. This is essentially MIMD within SIMD. Now it is possible to essentially configure the same SIMD machine as a MIMD system or a machine of still a different configuration. This is because it is possible to program the picket to operate with it's own sequence of instructions.

Because each picket can be made to have its own sequence, decoding a very simple set of instructions at the picket level is possible and this allows more extensive local processing to take place. The areas where this function is most likely to find initial application is in complex decision making, however simple fixed point processing will be another area of interest to programmers.

A simple such program would load blocks of a picket program, say not to exceed 2K into picket memory 102, and these can be executed when the SIMD controller card 703 initiates local execution through the execution control beginning at a specified xyz address. This would be continued as the controller either counts off so many clocks, or tests for a task complete signal by monitoring the Status Funnel (SF) Registers illustrated in FIG. 4.

The status funnel (SF FIG. 4) makes use of the latch 104 for each picket. Each picket has a latch 104 which can be loaded to reflect the status condition of the picket. The SIMD controller can test the collective value in these latches (one per picket) by monitoring an array status line. This array status line is the logical combination of the values from each of the picket status latches.

In the following example, assume we want to adjust a value that are bigger than 250 to be in the range 500<xx<= 250. The following routine would use the status funnel to detect that the task was accomplished.

If VALUE<500 then TURN YOUR PICKET OFF
STAT←PICKET OFF CONDITION
IF STAT FUNNEL=OFF then finished - - -
VALUE←VALUE−250
Repeat So, the multiple parallel picket processors configuration can be configured in various manners, and as a SIMD processor. Such a SIMD machine in the preferred embodiment is programmed to execute a single thread of instructions in the classical manner, and coded to execute on the array of SIMD processors in sequential fashion similar to classical processors, under general control of a SIMD controller or sequencer. At the application level this is accomplished by vector and vector like instructions, and vectors can be processed within processors and across processor. Vector instructions can be added with macroinstructions, typically with 6 to 10 such instructions.

With such a preferred embodiment, the system will appear schematically as illustrated in the functional block diagram of the parallel processor subsystem illustrated in FIG. 6. Through the I/O ports of the system as controlled by the host interface control 413 the subsystem sequencer functions similarly to a SIMD program with high function macros controlling the functions of the processing elements. Memory addressing enables an 8 bit, byte wide, data flow, and modulo8 arithmetic logic is used for functions (logical, add, multiply and divide). Provision is made for floating point format and for autonomous picket operation with individual sleep and dose mode and separate addressing.

The sub-system controller's arrangement is illustrated in FIG. 7. Each of the processor array cards 512 (shown as 4 in this subsystem illustration, but capable of being reduced to 2 SEM E cards) are coupled to a sequencer CRP 703, which is coupled to a subsystem controller 702 which in turn is ported to either the main memory system or to another subsystem in the configuration via a chip 705 interface to the associated microchannel bus 706. In the preferred embodiment the subsystem controller is a general purpose microprocessor unit of the IBM Corporations PS/2 (a trademark of IBM) and employs an Intel 386 processing chip and 4 Mbytes memory. The personal computer microprocessor MP 702 is coupled to the sequencer's card via a microchannel type bus 705 706 within the subsystem.

Obviously, many modifications and variations of this invention are possible in light of these teachings, and it is therefore understood that the appended claims permit the invention to be practiced other than as specifically described.

We claim:

1. An associative parallel processing system comprising:

a plurality of pickets, each picket having a multi-bit parallel processing element, a local memory, and a multi-bit parallel data path interconnecting said processing element with said local memory, said local memory having significant addressable storage locations individually accessible by said multi-bit parallel processing element for reading or writing of data contained in the storage locations, wherein the local memories of the plurality of pickets contain one or more data sets, with each local memory containing a distinct portion of each data set, the distinct portion including data stored at said addressable storage locations;

an interconnection path coupled to the plurality of pickets, said interconnection path providing each picket with common data and an associative operation for execution by said multi-bit parallel processing element;

an external control sequencer and a local control register means for controlling the plurality of pickets;

wherein the multi-bit parallel processing element of each picket executes the associative operation using the common data and the data located at one of said addressable locations in the local memory interconnected thereto with each picket providing the results of the associative operation; and wherein said system is configurable as a SIMD and a MIMD system, and groups of said plurality of pickets are assigned to a programmable configuration according to instructions programmed into the local memories of said plurality of pickets by an external controller, and wherein individual pickets have local autonomy for executing said instructions.

2. An associative parallel processing system according to claim 1 wherein the local memory of each of the plurality of pickets are arranged in an array, each local memory connected to said interconnection path, thereby forming a set associative memory, and wherein the interconnection path is a broadcast bus which is one or more bytes wide, from which all pickets are provided with the common data, the associative operation, instructions, a picket control data and address propagation transfers; and the coupling within each picket between the processing element and the local memory is one or more bytes wide.

3. An associative parallel processing system according to claim 2 wherein the plurality of pickets are formed on a silicon base chip.

4. An associative parallel processing system according to claim 2 where the plurality of pickets are arranged in an array, having paths for data flow between each picket of the array and adjacent pickets in the array and with a slide means providing for data transfer to non-adjacent pickets in the array.

5. An associative parallel processing system according to claim 4 wherein the slide means provides for the transfer of data in a single clock cycle to a non-adjacent picket in the array by sending the data across intervening pickets which are transparent to the transfer.

6. An associative parallel processing system according to claim 5 where prior to a transfer cycle, intervening pickets between a first picket and a remote picket are made transparent by turning the intervening pickets off, and then in the transfer cycle the slide means causes the first picket to send its information to its destination at the remote picket.

7. An associative parallel processing system according to claim 5 wherein means are provided for transferring messages linearly across the array.

8. The associative parallel processing system of claim 5 wherein the array of pickets are interconnected as a lattice and wherein means are provided for transferring messages linearly across the lattice.

9. The associative parallel processing system of claim 5 wherein the array of pickets are interconnected as a mesh and wherein means are provided for transferring messages linearly across the mesh.

10. The associative parallel processing system of claim 5 wherein the array of pickets are interconnected as a three-dimensional array and wherein means are provided for transferring messages linearly across the three-dimensional array.

11. An associative parallel processing system according to claim 3 wherein the silicon chip provides for at least 32 Kbytes storage for each local memory and there are sixteen pickets provided as nodes of a linear sub-array.

12. An associative parallel processing system according to claim 3 wherein the local memory of each picket is CMOS DRAM organized in a memory array and which supports row-column access by deleting the column demultiplexing on the back of the memory array, and which provides a row address that reads out a row of the memory array to cause data flows in parallel.

13. An associative parallel processing system according to claim 2 wherein a section of said local memory of each picket comprising a plurality of said addressable locations includes logic for providing associative memory operation in said section such that the data elements at every location in said section simultaneously performs a match compare operation against a given pattern in response to said common data and said associative operation when the associative operation is a match compare operation.

14. An associative parallel processing system according to claim 2 wherein said addressable locations of the local memory of each picket, in addition to said data elements, contains tri-bits, said tri-bits including a first bit representing a data bit value and a second bit representing whether a match operation performed on said data bit value provides an output irrespective of said data bit value.

15. An associative parallel processing system according to claim 2 wherein there is provided an external control processor for the plurality of pickets, and wherein micro-control code is transferred in parallel to all of the pickets in a group of said pickets, and wherein the external control processor and the pickets are synchronized to a clock having clock cycles, such that the functions controlled by the external control processor are executed in one or more clock cycles of the clock.

16. An associative parallel processing system according to claim 15 further comprising a control system microprocessor coupled to the external control processor via a micro-channel bus, wherein said control system microprocessor manages the array of pickets, and wherein the control system microprocessor is coupled so that all pickets of the array may execute a same instruction, although subsets of pickets can react individually to the same instruction.

17. An associative parallel processing system according to claim 2 whereby there is provided a plurality of pickets arranged in an array having paths for data flow between the pickets, said data flow paths providing for bit parallel broadcast communication with all in the array and providing for data flow between pickets.

18. An associative parallel processing system according to claim 17 whereby said data flow paths are implemented using wire-or or Dot connected pickets.

19. An associative parallel processing system according to claim 1 wherein the plurality of pickets are arranged along an address bus for communication with an external picket controller, and wherein there is a vector address common to the local memory of each of the pickets and wherein there is a data vector address register means provided for control of what data passes to each local memory of the plurality of pickets.

20. An associative parallel processing system according to claim 1 wherein a control means having an external control store is coupled to the plurality of pickets providing for a plurality of control functions including a doze function which causes the picket to enter an inactive but aware state when a status output of the picket meets a specific condition, said control functions provided to the picket after retrieval from the external control store.

21. The associative parallel processing system of claim 20 wherein the control functions further includes an inhibit function which prevents the picket from writing to the local memory based on conditions in the picket.

22. The associative parallel processing system of claim 21 wherein the control functions further includes an enable write function which enables the picket to write to the local memory based on conditions in the picket.

23. An associative parallel processing system according to claim 1, further including a main processor system, said main processor system communicating with said external control sequencer across a bus, and said main processor system having means for causing the plurality of pickets to perform associative operations.

24. An associative parallel processing system according to claim 23 wherein said external control sequencer is provided with high level macros for controlling the functions of the pickets coupled to said external control sequencer by the interconnection path, and wherein memory addressing of the local memory for each of the pickets enables byte wide data flow and modulo 8 arithmetic logic to be used for logical, add, multiply and divide functions, and wherein provision is made for floating point operation within said pickets, and for individual sleep and doze modes with separate addressing of individual pickets, said sleep and doze modes characterized by suspended operation of a picket in response to a predetermined condition during an operation.

25. An associative parallel processing system according to claim 23 wherein the operation of functions allocable to said main processor system, said external control sequencer with canned routines, said local register means, or within said plurality of pickets, and wherein single instructions requiring extended processing of multiple data are assigned to said plurality of pickets which are configured for SIMD processing.

26. An associative parallel processing system according to claim 1 where the processing element of each picket has access to its own coupled local memory, and wherein character wide, or character multiples wide data and instructions flow between pickets in one clock cycle of the system.

27. An associative parallel processing system according to claim 1 wherein there is provided picket control means for providing a control function for individual operation by a picket.

28. An associative parallel processing system according to claim 1 wherein the local memory has a multibit binary reference storage address.

29. An associative parallel processing system according to claim 1 wherein each picket is provide with a mask, wherein said associative operation is a match operation which utilizes said mask and said common data to determine whether the distinct portion of the data set from local memory matches, wherein said matching pickets raise a match line.

30. An associative parallel processing system according to claim 1 wherein local memory is a multi-bit wide DRAM and logic of each processing element is formed on a silicon base substrate, and wherein there is a direct one-on-one coupling between the local memory and its element, said local memory having cells which have a multi-bit address.

31. An associative parallel processing system according to claim 1, wherein each picket is provided with mask registers and a latch, said latch providing a coupling port for each picket along the interconnection path.

32. An associative parallel processing system according to claim 1 wherein said external control sequencer is coupled to a microcode memory, said microcode memory containing canned routines.

33. An associative parallel processing system according to claim 1 wherein the plurality of pickets are arranged in an array, and wherein a picket selectively operates according to its own sequence of instructions, and selectively performs operations connected with other pickets based on data conditions, and wherein pickets independently perform alignment and normalization operations which are associated with floating point operations.

34. An associative parallel processing system according to claim 1 wherein said external control sequencer is provided with high level macros for controlling the functions of the pickets coupled to said external controls sequencer by the interconnection path, wherein said high level macros are stored in a canned routine library coupled to said external control sequencer, said high level macros providing for one or more of the following functions: Load, Block, Sin, Cos, Find, Min, Range, Read, Add, Multiply, Match and Matrix Multiply.

35. The associative parallel processing system of claim 1 wherein the interconnection path also provides an address, each picket using the address to obtain the distinct portion of a data set from the local memory.

36. An associative parallel processing system comprising:

a plurality of pickets, each picket having a multi-bit parallel processing element, a local memory, and a multi-bit parallel data path interconnecting said processing element with said local memory, said local memory having significant addressable storage locations individually accessible by said multi-bit parallel processing element for reading or writing of data contained in the storage locations, wherein the local memories of the plurality of pickets contain one or more data sets, with each local memory containing a distinct portion of each data set, the distinct portion including data stored at said addressable storage locations;

an interconnection path coupled to the plurality of pickets, said interconnection path providing each picket with common data and an associative operation for execution by said multi-bit parallel processing element;

wherein the multi-bit parallel processing element of each picket executes the associative operation using the common data and the data located at one of said addressable locations in the local memory interconnected thereto, with each picket providing the results of the associative operation; and wherein each processing element comprises: an ALU, a mask register, a latch coupled to an input of said ALU, a status register (SR) coupled to said ALU, and a plurality of data flow registers (DF) which are intercoupled, at least one of the data flow registers directly coupled to an output of said ALU.

37. An associative parallel processing system comprising:

a plurality of pickets, each picket having a multi-bit parallel processing element, a local memory, and a multi-bit parallel data path interconnecting said processing element with said local memory, said local memory having significant addressable storage locations individually accessible by said multi-bit parallel processing element for reading or writing of data contained in the storage locations, wherein the local memories of the plurality of pickets contain one or more data sets, with each local memory containing a distinct portion of each data set, the distinct portion including data stored at said addressable storage locations;

an interconnection path coupled to the plurality of pickets, said interconnection path providing each picket with common data and an associative operation for execution by said multi-bit parallel processing element; and wherein the multi-bit parallel processing element of each picket, in response to the associative operation and common data, executes a plurality of independent locally stored instructions to operate on the common data and the data located at a plurality of addressable locations in the local memory interconnected thereto such that each picket provides the result of the associative operation.

* * * * *